United States Patent
Park (10) Patent No.: US 7,119,850 B2
(45) Date of Patent: Oct. 10, 2006

(54) SUB PICTURE CONTROL APPARATUS AND METHOD FOR TELEVISION RECEIVER

(75) Inventor: Sang-O Park, Kyongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 593 days.

(21) Appl. No.: 10/381,721

(22) PCT Filed: Aug. 20, 2001

(86) PCT No.: PCT/KR01/01406

§ 371 (c)(1),
(2), (4) Date: Mar. 28, 2003

(87) PCT Pub. No.: WO02/17613

PCT Pub. Date: Feb. 28, 2002

(65) Prior Publication Data

US 2004/0100578 A1    May 27, 2004

(30) Foreign Application Priority Data

Aug. 21, 2000 (KR) ............................... 2000-48335

(51) Int. Cl.
   *H04N 5/45*    (2006.01)
(52) U.S. Cl. .................... 348/565; 348/561; 348/474
(58) Field of Classification Search ........ 348/565–568, 348/468, 564, 561–562, 563, 460, 473, 474; H04N 5/45
   See application file for complete search history.

(56) References Cited

U.S. PATENT DOCUMENTS

| | | | |
|---|---|---|---|
| 4,665,438 A | * | 5/1987 | Miron et al. ................. 348/567 |
| 5,541,662 A | * | 7/1996 | Adams et al. ............... 348/460 |
| 6,008,860 A | | 12/1999 | Patton et al. ................ 348/565 |
| 6,762,798 B1 | * | 7/2004 | Messer et al. .............. 348/565 |

FOREIGN PATENT DOCUMENTS

EP    0 984 628 A1    3/2000

* cited by examiner

*Primary Examiner*—Michael H. Lee
(74) *Attorney, Agent, or Firm*—Fleshner & Kim, LLP (57) ABSTRACT

Disclosed is a sub picture control apparatus and method for a TV that can achieve an effective viewing of the sub picture. The apparatus includes a region data extracting section (52) for extracting region data included in a broadcasting signal tuned by a second tuner (43), a second luminance/chrominance (Y/C) separating section (45) for separating a chrominance signal and a luminance signal from the broadcasting signal selected by the second tuner (43), a region extracting section/scaler (46) for extracting a video signal of a region corresponding to a specified region information and performing a picture size adjustment with respect to the extracted video signal, and a control section (53) for controlling a region extracting section/scaler (46) to extract the video signal corresponding to a region information extracted from the region extracting section/scaler (46) and controlling a video processing section (48) to process an output signal of the region extracting section/scaler (46).

33 Claims, 7 Drawing Sheets

```
struct RegionInfo {
    int StartX        //X coordinate of start point of region
    int StartY        //Y coordinate of start point of region
    int Wide          //width of region
    int Hight         //height of region
    int GOPNo         //related GOP number
```

FIG. 8

SUB PICTURE CONTROL APPARATUS AND METHOD FOR TELEVISION RECEIVER

TECHNICAL FIELD

This application claims priority of PCT/KR01/01406, filed Aug. 20, 2001, published on Feb. 28, 2002, Publication No. WO 02/17613 A2 in the English language and which claimed priority to Korean Patent Application No. 2000/48335 filed Aug. 21, 2000.

BACKGROUND ART

Figure 1:
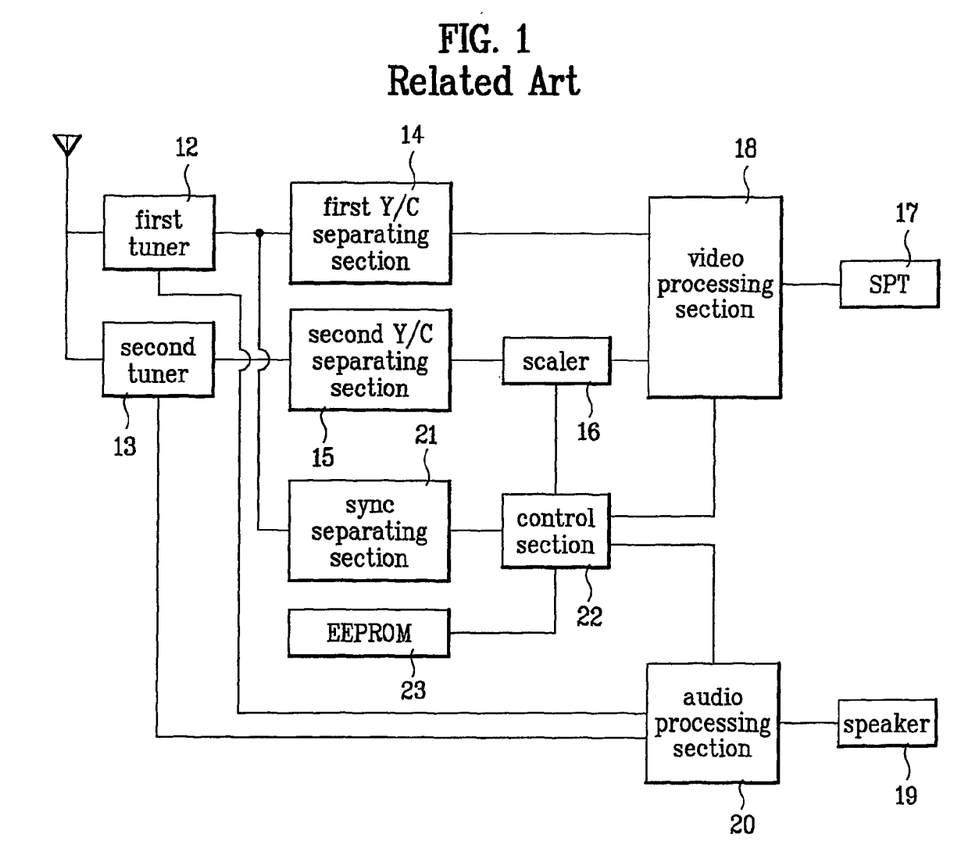
FIG. 1 is a block diagram illustrating the construction of a conventional TV.

A conventional television receiver (TV), as shown in FIG. 1, includes a first tuner 12 and a second tuner 13 for respectively selecting specified broadcasting signals for constructing a main picture and a sub picture among broadcasting signals received through an antenna 11, a first luminance/chrominance (Y/C) separating section 14 and a second luminance/chrominance (Y/C) separating section 15 for separating the broadcasting signals selected by the first tuner 12 and the second tuner 13 into chrominance signals and luminance signals, respectively, a scaler 16 for adjusting the size of picture with respect to an output of the first Y/C separating section 15, a color picture tube (CPT) 17, a video processing section 18 for mixing and video-processing outputs of the first Y/C separating section 14 and the scaler 16 to display the processed video signal on the CPT 17, a speaker 19, an audio processing section 20 for processing audio signals of the broadcasting signals selected by the first tuner 12 and the second tuner 13 to output the processed audio signal through the speaker 19, a sync separating section 21 for separating horizontal/vertical sync signals from the output of the first tuner 12, a control section 22 for controlling the scaler 16 to adjust the position and size of the sub picture, controlling the video processing section 18 to video-process the main picture signal according to the horizontal/vertical sync signals separated by the sync separating section 21, and controlling the audio processing section 20 to process the audio signal, and an EEPROM 23 for storing an operation program of the control section 22 and various kinds of set data.

The sub picture control operation of the conventional TV as constructed above will now be explained.

First, a user turns on the power of the TV, and selects one channel as the main picture and another channel as the sub picture.

Accordingly, the control section 22 controls the first tuner 12 and the second tuner 13, so that the first tuner 12 selects the channel broadcasting signal for the main picture, and the second tuner 13 selects the channel broadcasting signal for the sub picture.

Then, the main picture broadcasting signal and the sub picture broadcasting signal are separated into chrominance signals and luminance signals through the first tuner 12 and first Y/C separating section 14, and the second tuner 13 and second Y/C separating section 15, respectively.

The output of the second Y/C separating section 15 is inputted to the scaler 16, and the picture size of the sub picture is adjusted through the scaler 16 under the control of the control section 22.

The output of the first Y/C separating section and the output of the scaler 16 are mixed together and video-processed in the video processing section 18 under the control of the control section 22, and then displayed on a screen of the CPT 17.

Meanwhile, the audio signals of the broadcasting signals selected through the first tuner 12 and the second tuner 13 are processed in the audio processing section 20 under the control of the control section 22, and then outputted through the speaker 19.

Figure 2:
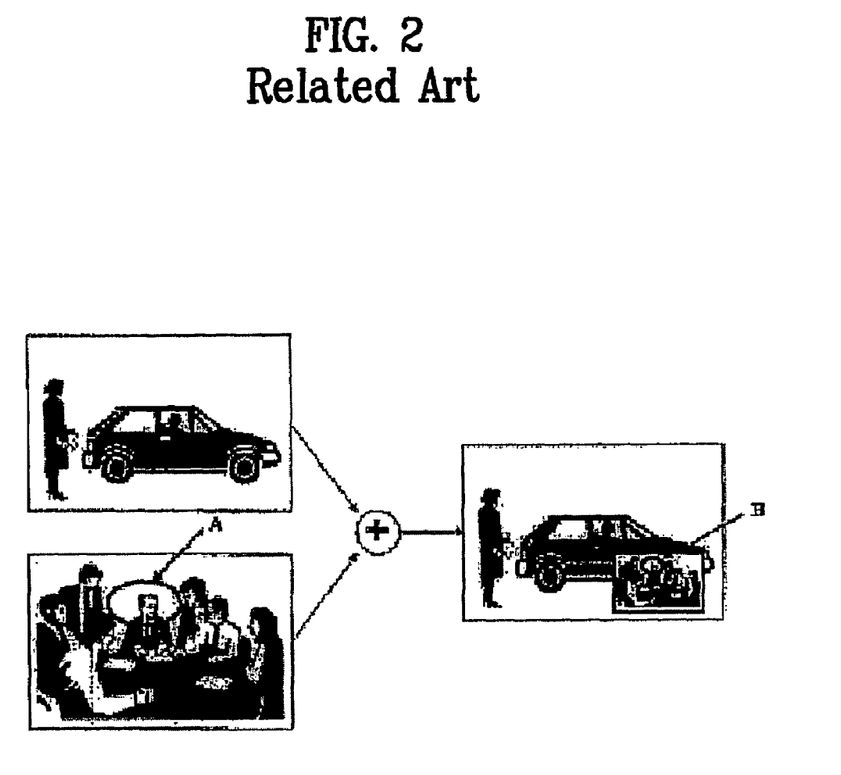
FIG. 2 is a view illustrating an example of a sub picture display according to the conventional TV.

At this time, as shown in FIG. 2, the whole sub picture according to the conventional technique is scaled to a predetermined size, and displayed on a corresponding position of the screen.

For example, if it is assumed that a character 'A' is the core element of the whole picture, this picture is scaled as it is and displayed as the sub picture, and the character 'B' is shown in the sub picture. As shown in FIG. 2, the character 'B' is so small that its shape cannot be almost recognized in the sub picture.

That is, according to the conventional TV, since the whole picture is scaled as it is and displayed as the sub picture, the core element of the sub picture cannot be accurately recognized, and the sub picture desired by the user cannot be obtained, causing the user's dissatisfaction.

DISCLOSURE OF THE INVENTION

Therefore, an object of the present invention is to solve the problems involved in the prior art and to provide a sub picture control apparatus and method for a TV that can achieve an effective viewing of the sub picture by constructing and displaying the sub picture centering around the core element of the whole sub picture.

In order to accomplish the above-mentioned object, the present invention provides a sub picture control apparatus for a TV comprising a tuner for selecting a specified broadcasting signal for constructing a sub picture among broadcasting signals received through an antenna, a luminance/chrominance (Y/C) separating section for separating a chrominance signal and a luminance signal from the broadcasting signal selected by the tuner, a region extracting section/scaler for extracting a video signal of a region corresponding to a specified region information from a video signal of the whole picture outputted from the Y/C separating section, and performing a picture size scaling with respect to the extracted video signal, a display section, a video processing section for video-processing an output of the region extracting section/scaler to enable the output of the region extracting section/scaler to be displayed on the display section, a region information extracting section for extracting the region information included in the broadcasting signal selected through the tuner, and a control section for controlling the region extracting section/scaler to extract the video signal corresponding to the region information extracted by the region information extracting section from the video signal of the whole picture and to adjust a position and a size of the sub picture, and controlling the video processing section to video-process the output of the region extracting section/scaler.

In another aspect of the present invention, there is provided a sub picture control method for a TV comprising the steps of a broadcasting station transmitting a broadcasting signal including sub picture region information, if a user selects a sub picture, selecting the broadcasting signal of a corresponding channel, and extracting the sub picture region information included in the broadcasting signal of the corresponding channel using a region information extracting means, and extracting a video signal corresponding to the sub picture region information from the broadcasting signal, processing the extracted video signal as the sub picture, and displaying the sub picture with a main picture.

BRIEF DESCRIPTION OF THE DRAWINGS

The above object, other features and advantages of the present invention will become more apparent by describing the preferred embodiment thereof with reference to the accompanying drawings, in which.

BEST MODE FOR CARRYING OUT THE INVENTION

Now, the sub picture control apparatus and method for a TV according to a preferred embodiment of the present invention will be described in detail with reference to the annexed drawings.

Figure 3:
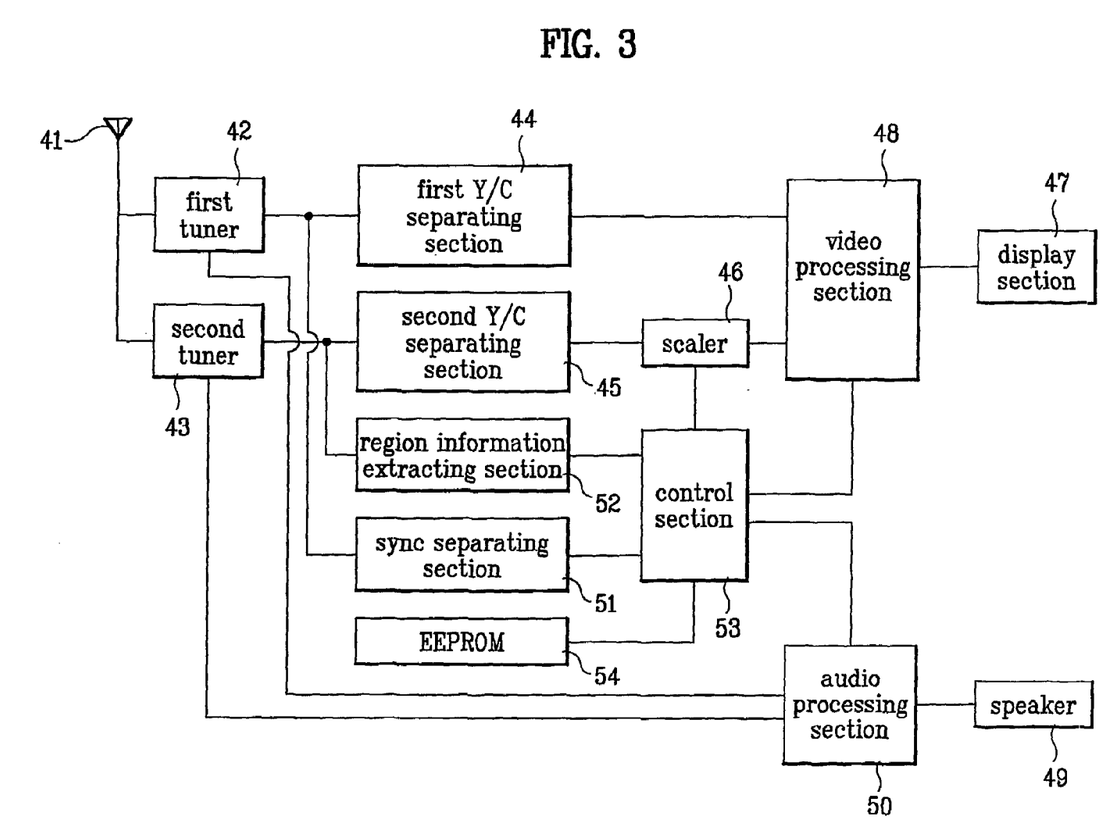
FIG. 3 is a block diagram illustrating the construction of a sub picture control apparatus for a TV according to the present invention.
Figure 4:
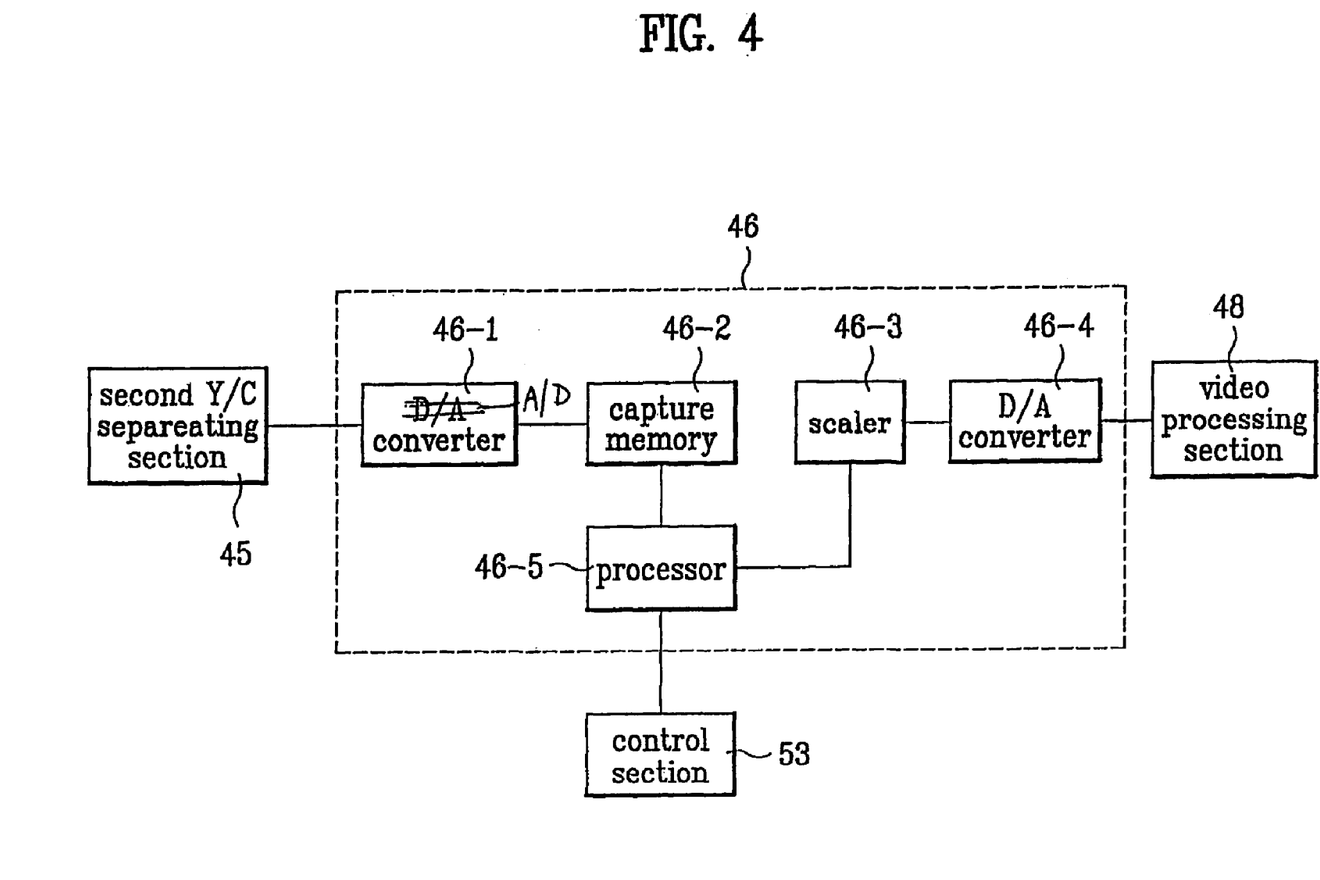
FIG. 4 is a block diagram illustrating the detailed construction of a region extracting section/scaler according to the present invention.
Figure 5:
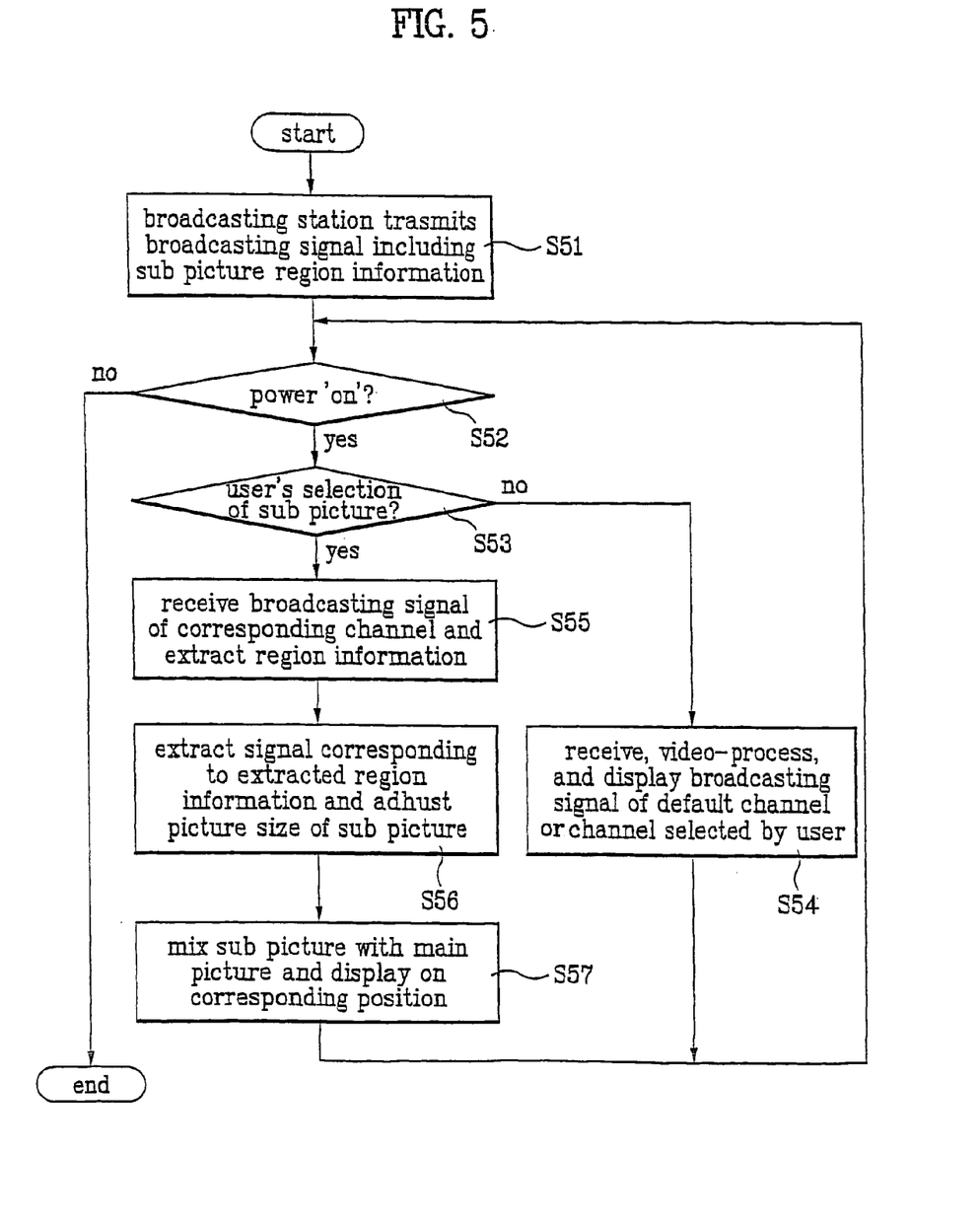
FIG. 5 is a flowchart illustrating a sub picture control method for a TV according to the present invention.
Figure 6:
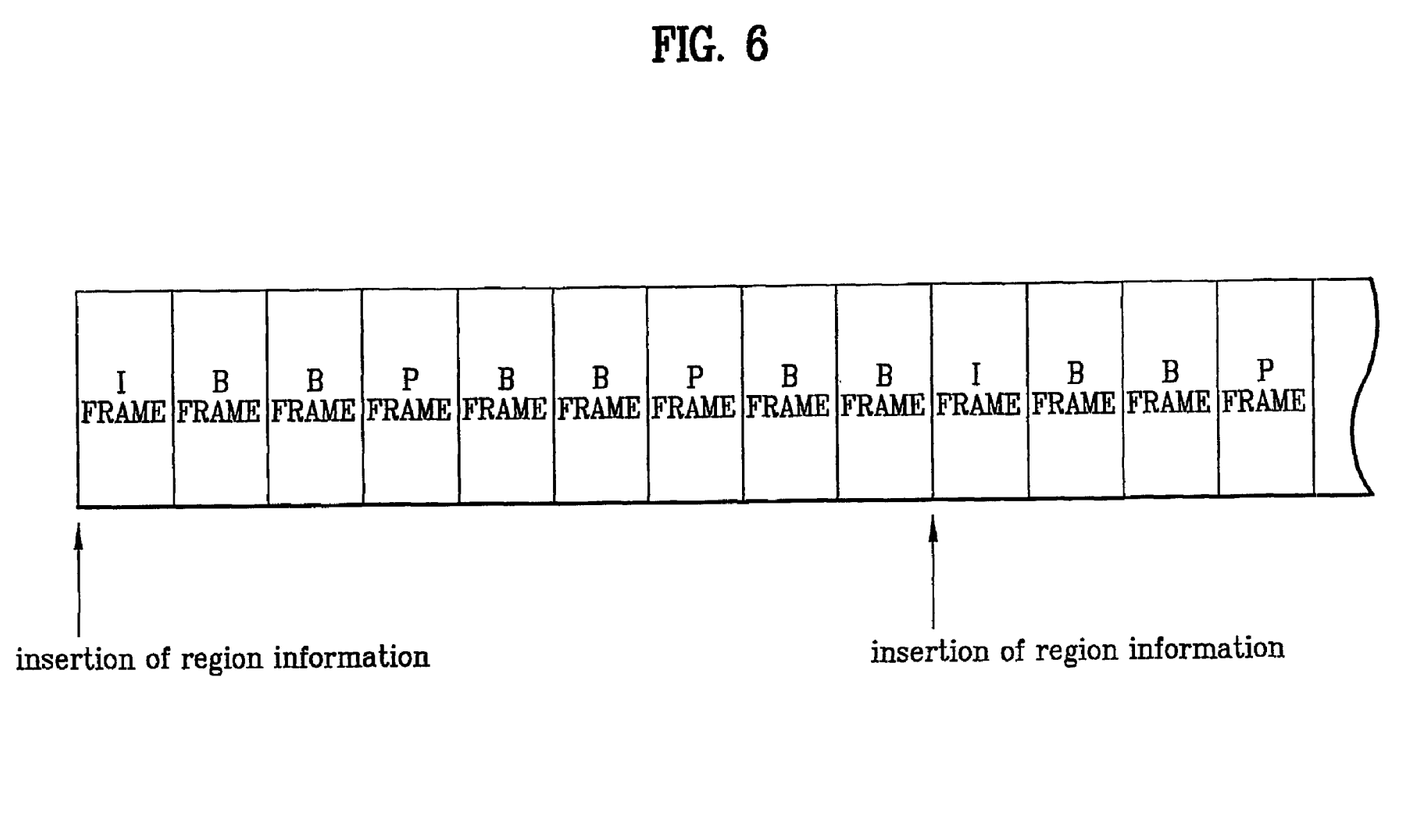
FIG. 6 is a view explaining the process of inserting sub picture region information according to the present invention.
Figure 7:
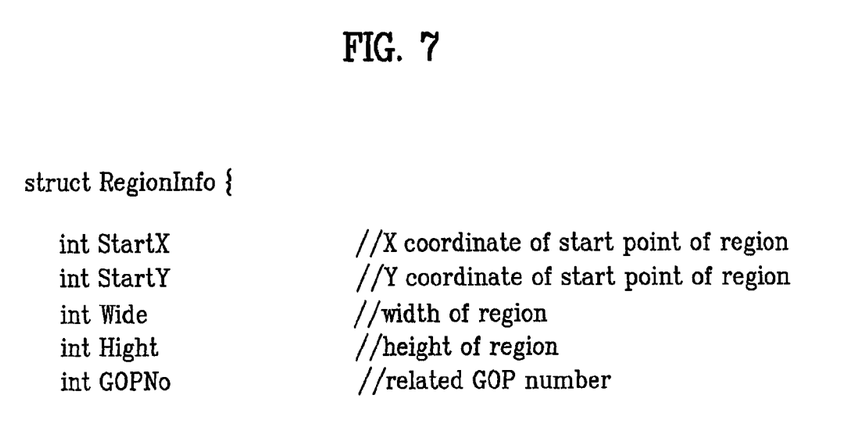
FIG. 7 is a view illustrating an example of the construction of the sub picture region information according to the present invention.
Figure 8:
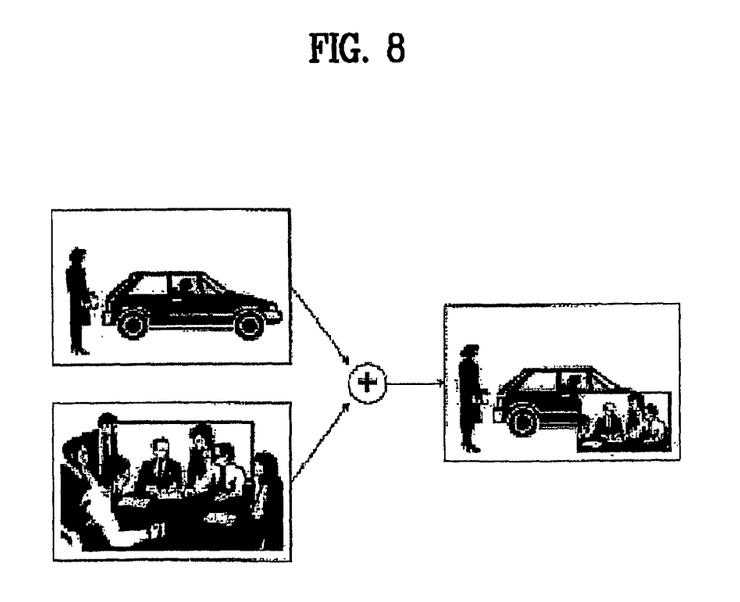
FIG. 8 is a view illustrating an example of a sub picture display for a TV according to the present invention.

FIG. 3 is a block diagram illustrating the construction of a sub picture control apparatus for a TV according to the present invention, and FIG. 4 is a block diagram illustrating the detailed construction of a region extracting section/scaler according to the present invention. FIG. 5 is a flowchart illustrating a sub picture control method for a TV according to the present invention, and FIG. 6 is a view explaining the process of inserting sub picture region information according to the present invention. FIG. 7 is a view illustrating an example of the construction of the sub picture region information according to the present invention, and FIG. 8 is a view illustrating an example of a sub picture display for a TV according to the present invention.

As shown in FIG. 3, the sub picture control apparatus according to the present invention includes a first tuner 42 and a second tuner 43 for respectively selecting specified broadcasting signals for constructing a main picture and a sub picture among broadcasting signals received through an antenna 41, a first luminance/chrominance (Y/C) separating section 44 and a second luminance/chrominance (Y/C) separating section 45 for separating the broadcasting signals selected by the first tuner 42 and the second tuner 43 into chrominance signals and luminance signals, respectively, a region extracting section/scaler 46 for extracting a video signal of a region corresponding to a specified region information from a video signal of the whole picture outputted from the second Y/C separating section 45 and performing a picture size scaling with respect to the extracted video signal, a display section 47, a video processing section 48 for mixing and video-processing outputs of the first Y/C separating section 44 and the region extracting section/scaler 46 to display the processed video signal on the display section 47, a speaker 49, an audio processing section 50 for processing audio signals of the broadcasting signals selected by the first tuner 42 and the second tuner 43 to output the processed audio signal through the speaker 49, a sync separating section 51 for separating horizontal/vertical sync signals from the output of the first tuner 42, a region information extracting section 52 for extracting the region information included in the broadcasting signal selected through the second tuner 43, a control section 53 for controlling the region extracting section/scaler 46 to extract the video signal corresponding to the region information extracted by the region information extracting section 52 from the video signal of the whole picture and to scale a position and a size of the sub picture, and controlling the video processing section 48 and the audio processing section 50 to process video and audio signals of the main picture, and an EEPROM 54 for storing an operation program of the control section 53 and various kinds of set data.

The region extracting section/scaler 46, as shown in FIG. 4, includes an analog-to-digital (A/D) converter 46-1 for converting the output of the second Y/C separating section 45 into a digital signal, a capture memory 46-2 for capturing an output corresponding to a predetermined region among an output of the A/D converter 46-1, a scaler 46-3 for performing the picture size adjustment with respect to stored information of the capture memory 46-2, a digital-to-analog (D/A) converter 46-4 for converting an output of the scaler 46-3 into an analog signal and transmitting the analog signal to the video processing section 48, and a processor 46-5 for controlling the capture memory 46-2 to capture the output of the A/D converter 46-2 and controlling the scaler 46-3 to perform the picture size scaling to a predetermined size.

The operation of the sub picture control apparatus according to the present invention as constructed above will be explained with reference to FIGS. 5 to 8.

A broadcasting station transmits broadcasting signals that include sub picture region information (step S51).

In explaining the region information determining principle, for example, in case that the selected channel corresponds to sports broadcasting, scoreboard-oriented sub picture region information is determined so that the user can easily recognize the present score state of both teams. In case of news broadcasting, caption or photograph-oriented sub picture region information is determined, while in case of commercial broadcasting or shopping-related broadcasting, sub picture information focused on a product name, photograph of product, and manufacturer name is determined.

The sub picture region information determined as above is transmitted as follows.

In case of a digital TV, the picture unit is a group of picture (GOP) that is composed of a predetermined number of frames, for example, 'I', 'B', and 'P' frames as shown in FIG. 6, and the frames in the same GOP have almost no change of picture. Accordingly, the sub picture region information to be transmitted is included in the 'I' frame among the GOP frames, and especially in an MPEG-2 reserved section of the 'I' frame. At this time, as shown in FIG. 7, the sub picture region information includes an X coordinate of a region start point, Y coordinate of the region start point, width of the region, height of the region, and related number of GOP.

Meanwhile, if the power of the TV is in an on state (step S52), the control section 53 judges whether the user selects the sub picture (step S53).

If it is judged that the user does not select the sub picture, the control section 53 controls the first tuner 42 and the video processing section 48, so that the broadcasting signal of a default channel or a channel selected by the user is video-processed, and displayed through the display section 47 (step S54).

Meanwhile, if it is judged that the user selects the sub picture, the control section 53 controls the second tuner 42 to select the broadcasting signal of the corresponding channel, and controls the region information extracting section 52 to extract the region information included in the broadcasting signal (step S55).

Then, the control section 53 controls the operation of the region extracting section 46 to extract the video signal of the region corresponding to the region information extracted by the region information extracting section 52, and controls the scaling operation so that the size of picture is scaled to the predetermined picture size.

Accordingly, the region extracting section/scaler 46 extracts the video signal of the corresponding region from the video signal outputted from the second Y/C separating section 45 and performs the picture size scaling under the control of the control section 53 (step S56).

At this time, the detailed operation of the region information extracting section 52 is as follows.

First, the A/D converter 46-1 converts the output of the second Y/C separating section 45 into a digital signal.

Then, the processor 46-5 stores the video signal of the region determined by the control section 53 in the capture memory 46-2, and transmits the video signal stored in the capture memory 46-2 to the scaler 46-3 to perform the specified picture size scaling.

Accordingly, the scaler 46-3 performs the picture size scaling with respect to the video signal transmitted through the processor 46-5, and the D/A converter 46-4 converts the output of the scaler 46-3 into an analog video signal to output the analog video signal to the video processing section 48.

The video signal of the corresponding region to which the picture size scaling is performed is mixed with the main picture video signal through the video processing section 48 under the control of the control section 53 to be video-processed, and then displayed through the display section 47 (step S57).

As shown in FIG. 8, only a determined region A' of the whole picture is finally displayed as the sub picture B' in contrast to the conventional technique that adjusts the size of the whole picture as it is, and thus the user can easily recognize the core character or element of the picture.

The sub picture control apparatus and method for a TV according to the present invention as described above can also be applied to the following cases.

In case of baseball game broadcasting, the region information is focused on the scoreboard, and the sub picture constructed centering around the scoreboard is displayed, so that the user can easily recognize the score state.

In case of soccer game broadcasting, the region information is focused on the ball, and the sub picture constructed centering around the ball is displayed, so that the user can enjoy watching the soccer game with more amusement.

In case of news broadcasting, the region information is focused on the caption, and in case of commercial broadcasting or shopping-related broadcasting, the region information is focused on the product name or photograph of product, so that the user can more readily understand the news or advertisement.

INDUSTRIAL APPLICABILITY

As apparent from the above description, the sub picture control apparatus and method for a TV according to the present invention have the effects that the core region of the whole picture is extracted and displayed as the sub picture, and thus the user can easily and conveniently recognize the core element of the picture, enabling an effective viewing of the sub picture.

What is claimed is:

1. A sub picture control apparatus for a television receiver, comprising:
   a sub picture tuner for selecting a broadcasting signal for constructing a sub picture having a focus region of a whole picture, the whole picture corresponding to a program of a broadcasting channel carrying the selected broadcasting signal;
   a luminance/chrominance (Y/C) separating section for separating a chrominance signal and a luminance signal from the selected broadcasting signal, to output a video signal of the whole picture according to the separated Y/C signal;
   a region information extracting section for extracting region information included in the selected broadcasting signal, the extracted region information identifying the focus region of the whole picture;
   a region extracting section/scaler for extracting a video signal of the focus region from the video signal of the whole picture and for performing a picture size scaling with respect to the extracted video signal of the focus region; and
   a control section for controlling the video signal extraction and the scaling by the region extracting section/scaler according to the extracted region information, by setting a display position and a display size of the sub picture.

2. The apparatus as claimed in claim 1, further comprising:
   a main picture tuner, connected in parallel to the sub picture tuner, for selecting a broadcasting signal for a main picture from among a plurality of broadcasting signals.

3. The apparatus as claimed in claim 2, further comprising:
   a main picture Y/C separating section for separating a luminance (Y) signal and a chrominance (C) signal from the broadcasting signal selected by the main picture tuner.

4. The apparatus as claimed in claim 1, wherein the region extracting section/scaler comprises:
   an analog-to-digital (A/D) converter for outputting digital image data by converting the output of the Y/C separating section into a digital signal;
   a capture memory for capturing image data corresponding to the focus region from among the digital image data output by the A/D converter;
   a scaler for performing the picture size scaling with respect to stored information of the capture memory;
   a digital-to-analog (D/A) converter for converting an output of the scaler into an analog signal; and
   a processor for controlling the capture memory to capture the output of the A/D converter and for controlling the scaler to perform the picture size scaling according to the display size set by the control section.

5. A method of displaying pictures in a television receiver, the method comprising:

receiving a first video signal representative of a main picture and a second video signal representative of a sub picture, the second video signal including identification information identifying a focus region within the sub picture;

extracting the identification information from the second video signal;

extracting focus region image data from the second video signal according to the identification information; and displaying the focus region image data on a predetermined image portion of a display screen.

6. The method of claim 5, wherein the extracting focus region image data from the second video signal includes:

converting the second video signal into digital sub picture data;

extracting focus region image data from the digital sub picture data according to the identification information and storing the focus region image data in a memory;

scaling the stored image data; and converting the scaled focus region image data into analog image data.

7. The method of claim 5, wherein the displaying the focus region image data includes:

combining the focus region image data with the main picture; and displaying the combined image data on the display screen, so that the focus region image data is displayed on the predetermined image portion of the display screen.

8. The method of claim 5, wherein the identification information includes at least one of a horizontal coordinate of a start point of the focus region, a vertical coordinate of the start point of the focus region, a width of the focus region, and a height of the focus region.

9. The method of claim 8, wherein the identification information further includes a related group of pictures (GOP) number.

10. The method of claim 5, wherein the identification information is included in one of a plurality of frames within a group of pictures (GOP).

11. The method of claim 5, wherein the identification information is included in an I frame within a group of pictures (GOP).

12. The method of claim 11, wherein the identification information is included in an MPEG-2 reserved section of the I frame.

13. The method of claim 5, wherein the second video signal is a broadcast video signal.

14. The method of claim 5, wherein the predetermined image portion is a picture in picture (PIP) portion of the display screen.

15. A digital television receiver comprising:

a first tuner for receiving a first video signal representative of a main picture;

a second tuner for receiving a second video signal representative of a sub picture, the second video signal including identification information identifying a focus region within the sub picture;

a controller for analyzing the identification information and for generating a corresponding control signal according to a predetermined image portion of a display screen; and an image extracting unit for extracting focus region image data from the second video signal according to the corresponding control signal generated by the controller to enable display of the focus region image data on the predetermined image portion of the display screen.

16. The digital television receiver of claim 15, wherein the image extracting unit comprises:

an analog-to-digital (A/D) converter for converting the second video signal into digital sub picture data;

a processor for extracting focus region image data from the digital sub picture data stored in a capture memory according to the corresponding control signal generated by the controller;

a scaler for scaling the focus region image data extracted by the processor; and a digital-to-analog (D/A) converter for converting the scaled focus region image data into analog image data.

17. The digital television receiver of claim 15, further comprising:

a video processor for combining the focus region image data with the main picture; and a display unit for displaying the combined image data.

18. The digital television receiver of claim 15, wherein the identification information includes at least one of a horizontal coordinate of a start point of the focus region, a vertical coordinate of the start point of the focus region, a width of the focus region, and a height of the focus region.

19. The digital television receiver of claim 15, wherein the identification information is included in an I frame within a group of pictures (GOP).

20. The digital television receiver of claim 19, wherein the identification information is included in an MPEG-2 reserved section of the I frame.

21. The digital television receiver of claim 15, wherein the predetermined image portion is a picture in picture (PIP) portion of the display screen.

22. A sub picture control method for a television receiver, the method comprising:

receiving, on a broadcasting channel, a broadcasting signal for constructing a sub picture having a focus region of a whole picture, the whole picture corresponding to a program of the broadcasting channel;

extracting region information included in the selected broadcasting signal, the extracted region information identifying the focus region of the whole picture;

extracting a video signal of the focus region from the video signal of the whole picture and for performing a scaling with respect to the extracted video signal of the focus region; and controlling the video signal extraction and the picture size scaling by the region extracting section/scaler according to the extracted region information, by setting a display position and a display size of the sub picture.

23. The method as claimed in claim 22, wherein the region information is included in one frame of a group of pictures (GOP) of a transport stream transmitted from a broadcasting station.

24. The method as claimed in claim 23, wherein the region information is constructed of a field for each of at least a horizontal coordinate of a start point of the focus region, a vertical coordinate of the start point of the focus region, a width of the focus region, a height of the focus region, and a related GOP number.

25. The method as claimed in claim 23, wherein the region information is included in an I frame of the group of pictures.

26. The method as claimed in claim 25, wherein the region information is included in an MPEG-2 reserved section of the I frame.

27. The method as claimed in claim 22, wherein the region information includes information indicative of program type.

28. The method as claimed in claim 27, wherein the extracted region information is determined according to the program type.

29. The method as claimed in claim 22, further comprising:
- receiving a broadcasting signal of a default channel;
- determining whether a sub picture function has been selected; and
- video-processing and displaying the default channel broadcasting signal as the whole picture, if there has been no sub picture function selection.

30. The method as claimed in claim 29, wherein the default channel is a broadcasting channel selected by a user.

31. The method as claimed in claim 22, wherein the received broadcasting signal is selected from among a plurality of broadcasting signals transmitted from at least one broadcasting station.

32. The method as claimed in claim 31, further comprising:
- selecting, from among the plurality of broadcasting signals, a broadcasting signal for a main picture;
- video-processing the selected broadcasting signals by combining the extracted video signal of the region with the main picture broadcasting signal; and
- displaying the combined image data on the display screen, so that the focus region image data is displayed on the predetermined image portion of the display screen.

33. The method as claimed in claim 32, further comprising:
- separating a luminance (Y) signal and a chrominance (C) signal from the main picture broadcasting signal, to output a video signal of the main picture according to the separated Y/C signal.

* * * * *